(12) United States Patent
Ku et al.

(10) Patent No.: US 9,521,081 B2
(45) Date of Patent: Dec. 13, 2016

(54) SYSTEMS AND METHODS TO SELECT PEERED BORDER ELEMENTS FOR AN IP MULTIMEDIA SESSION BASED ON QUALITY-OF-SERVICE

(71) Applicant: AT&T Intellectual Property I, L.P., Atlanta, GA (US)

(72) Inventors: Bernard Ku, Austin, TX (US); James Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/959,980

(22) Filed: Dec. 4, 2015

(65) Prior Publication Data

US 2016/0087903 A1    Mar. 24, 2016

Related U.S. Application Data

(63) Continuation of application No. 13/951,195, filed on Jul. 25, 2013, now Pat. No. 9,246,824, which is a
(Continued)

(51) Int. Cl.
*H04L 12/66* (2006.01)
*H04L 12/28* (2006.01)
(Continued)

(52) U.S. Cl.
CPC .............. *H04L 47/24* (2013.01); *H04L 47/12* (2013.01); *H04L 65/1069* (2013.01); *H04L 65/80* (2013.01)

(58) Field of Classification Search
USPC ..................... 370/252, 389, 356, 352, 401
See application file for complete search history.

(56) References Cited

U.S. PATENT DOCUMENTS 6,363,065 B1    3/2002   Thornton et al.
6,426,955 B1    7/2002   Gossett Dalton, Jr. et al.
(Continued)

FOREIGN PATENT DOCUMENTS

WO    2009068111    6/2009

OTHER PUBLICATIONS

Rosenberg, J., "Requirements for Management of Overload in the Session Initiation Protocol draft-ietf-sipping-overload-reqs-00," IETF draft recommendation, Nov. 27, 2006, 20 pages. URL http://www.tools.ietf.org/id/draft-ietf-sipping-overload-reqs-00.txt.
(Continued)

*Primary Examiner* — Wutchung Chu
(74) *Attorney, Agent, or Firm* — Hanley, Flight & Zimmerman, LLC

(57) ABSTRACT

Systems and methods to select peered border elements for a communication session based on Quality-of-Service (QoS) are disclosed. An example method includes selecting a peered border element to handle a communication session based on a list of peered border elements (PBEs) and a composite QoS parameter of the communication session, the list of PBEs being prioritized based on respective statuses of PBEs in the list, the first composite QoS parameter being based on weighted QoS parameters of the communication session including a grade of service (GoS) parameter of the communication session and a preferred mode of communication for a VoIP device of a called party in the communication session, the GoS parameter including an attempted performance range and an expected performance range of the communication session; and controlling a second server to generate a QoS authorization token to reserve network resources associated with the selected PBE.

20 Claims, 5 Drawing Sheets

Related U.S. Application Data continuation of application No. 12/037,602, filed on Feb. 26, 2008, now Pat. No. 8,520,663.

(51) Int. Cl.
*H04L 12/851* (2013.01)
*H04L 29/06* (2006.01)
*H04L 12/801* (2013.01)

(56) References Cited

U.S. PATENT DOCUMENTS

| | | |
|---|---|---|
| 6,728,208 B1 | 4/2004 | Puuskari |
| 6,760,775 B1 | 7/2004 | Anerousis et al. |
| 6,788,676 B2 | 9/2004 | Partanen et al. |
| 6,856,991 B1 | 2/2005 | Srivastava |
| 6,888,821 B2 | 5/2005 | Rasanen et al. |
| 6,914,886 B2 | 7/2005 | Peles et al. |
| 7,047,315 B1 | 5/2006 | Srivastava |
| 7,072,360 B2 | 7/2006 | Dravida et al. |
| 7,088,718 B1 | 8/2006 | Srivastava |
| 7,145,898 B1 | 12/2006 | Elliott |
| 7,177,295 B1 | 2/2007 | Sholander et al. |
| 7,180,864 B2 | 2/2007 | Basu et al. |
| 7,180,912 B1 | 2/2007 | Samarasinghe |
| 7,197,040 B2 | 3/2007 | Bressoud et al. |
| 7,394,780 B1 * | 7/2008 | Gregory ............... H04L 1/0003 370/316 |
| 7,626,979 B1 | 12/2009 | Bugenhagen et al. |
| 7,672,312 B1 | 3/2010 | Hurtta |
| 7,688,859 B2 | 3/2010 | Chen et al. |
| 7,979,549 B2 | 7/2011 | Frost et al. |
| 8,041,825 B2 | 10/2011 | Gibbs et al. |
| 8,170,021 B2 | 5/2012 | Han et al. |
| 8,520,663 B2 | 8/2013 | Ku et al. |
| 8,996,705 B2 | 3/2015 | Morton et al. |
| 2002/0101860 A1 | 8/2002 | Thornton et al. |
| 2002/0150041 A1 * | 10/2002 | Reinshmidt ......... H04L 12/2697 370/216 |
| 2003/0079027 A1 | 4/2003 | Slocombe et al. |
| 2003/0117954 A1 | 6/2003 | De Neve et al. |
| 2003/0182410 A1 | 9/2003 | Balan et al. |
| 2003/0200307 A1 | 10/2003 | Raju et al. |
| 2004/0146045 A1 | 7/2004 | Jimmei et al. |
| 2004/0210670 A1 | 10/2004 | Anerousis et al. |
| 2005/0010653 A1 | 1/2005 | McCanne |
| 2005/0044141 A1 | 2/2005 | Hameleers et al. |
| 2005/0058125 A1 | 3/2005 | Mutikainen et al. |
| 2005/0083912 A1 | 4/2005 | Afshar et al. |
| 2005/0094609 A1 | 5/2005 | Tandai et al. |
| 2005/0149531 A1 | 7/2005 | Srivastava |
| 2005/0195741 A1 | 9/2005 | Doshi et al. |
| 2005/0238026 A1 | 10/2005 | Wu et al. |
| 2006/0013147 A1 | 1/2006 | Terpstra et al. |
| 2006/0064478 A1 | 3/2006 | Sirkin |
| 2006/0112170 A1 | 5/2006 | Sirkin |
| 2006/0130064 A1 | 6/2006 | Srivastava |
| 2006/0146792 A1 | 7/2006 | Ramachandran et al. |
| 2006/0149845 A1 | 7/2006 | Malin et al. |
| 2006/0159100 A1 | 7/2006 | Droms et al. |
| 2006/0165064 A1 | 7/2006 | Brown et al. |
| 2006/0209851 A1 | 9/2006 | Scudder et al. |
| 2006/0233155 A1 | 10/2006 | Srivastava |
| 2006/0233158 A1 | 10/2006 | Croak et al. |
| 2006/0233159 A1 | 10/2006 | Croak et al. |
| 2006/0291450 A1 | 12/2006 | Ramachandran et al. |
| 2007/0008882 A1 | 1/2007 | Oran |
| 2007/0019619 A1 | 1/2007 | Foster et al. |
| 2007/0019623 A1 | 1/2007 | Alt et al. |
| 2007/0019625 A1 | 1/2007 | Ramachandran et al. |
| 2007/0036143 A1 | 2/2007 | Alt et al. |
| 2007/0036151 A1 | 2/2007 | Baeder |
| 2007/0047446 A1 | 3/2007 | Dalal et al. |
| 2007/0058629 A1 | 3/2007 | Luft |
| 2007/0061397 A1 | 3/2007 | Gregorat et al. |
| 2007/0071221 A1 | 3/2007 | Allen et al. |
| 2007/0073898 A1 | 3/2007 | Shen |
| 2007/0086432 A1 | 4/2007 | Schneider et al. |
| 2007/0091878 A1 | 4/2007 | Croak et al. |
| 2007/0162599 A1 | 7/2007 | Nguyen |
| 2007/0165613 A1 | 7/2007 | Soo et al. |
| 2009/0052434 A1 | 2/2009 | Jackson |
| 2009/0059894 A1 | 3/2009 | Jackson et al. |
| 2009/0213837 A1 | 8/2009 | Ku et al. |
| 2011/0016145 A1 | 1/2011 | De Lutiis et al. |
| 2013/0308449 A1 | 11/2013 | Ku et al. |

OTHER PUBLICATIONS

United States Patent and Trademark Office, "Non-Final Office Action", issued in connection with U.S. Appl. No. 12/037,602, mailed Apr. 25, 2012 (18 pages).

United States Patent and Trademark Office, "Final Office Action", issued in connection with U.S. Appl. No. 12/037,602, mailed Jan. 30, 2013 (24 pages).

United States Patent and Trademark Office, "Notice of Allowance and Fee(s) Due", issued in connection with U.S. Appl. No. 12/037,602, mailed Apr. 24, 2013 (15 pages).

United States Patent and Trademark Office, "Notice of Allowance and Fee(s) Due", issued in connection with U.S. Appl. No. 13/951,195, mailed Nov. 16, 2015 (12 pages).

\* cited by examiner

SYSTEMS AND METHODS TO SELECT PEERED BORDER ELEMENTS FOR AN IP MULTIMEDIA SESSION BASED ON QUALITY-OF-SERVICE

RELATED APPLICATIONS

This patent is a continuation of U.S. patent application Ser. No. 13/951,195, (now U.S. Pat. No. 9,246,824, issued on Jan. 26, 2016) filed on Jul. 25, 2013, entitled "Systems and Methods to Select Peered Border Elements for an IP Multimedia Session Based on Quality-of-Service," which is a continuation of U.S. patent application Ser. No. 12/037,602 (now U.S. Pat. No. 8,520,663), filed on Feb. 26, 2008, entitled "Systems and Methods to Select Peered Border Elements for an IP Multimedia Session Based on Quality-of-Service." The entireties of U.S. patent application Ser. No. 12/037,602 and U.S. patent application Ser. No. 13/951,195 are incorporated herein by reference.

FIELD OF THE DISCLOSURE

This disclosure relates generally to Internet Protocol (IP) Multimedia communications and, more particularly, to systems and methods to select peered border elements for an IP Multimedia session based on Quality-of-Service (QoS).

BACKGROUND

In the field of packet-switched networks, service providers may often have peering relationships with other service providers. Peering relationships provide interconnectivity between the networks of the service providers and allow the customers of peering networks to connect. Peering is typically accomplished at established physical locations or exchange points using peered border elements, through which data may be exchanged between the networks. Two service providers with a peering relationship may maintain multiple exchange points to accommodate large services areas and reduce the distances packet data must travel to reach a destination. For example, two service providers in the United States may maintain exchange points in New York, Chicago, Houston and Los Angeles. Further, each exchange point may feature multiple peered border elements between a given pair of service providers.

Quality-of-Service (QoS), when used in communications, refers to resource reservation control. Implementing QoS may provide different priority levels to different users according to, for example, a customer service contract or an application type. QoS may also guarantee a certain level of performance to a data flow, which can be important when network capacity is limited (i.e., network congestion). Certain applications, such as Voice over Internet Protocol (VoIP), require a certain guarantee of availability and maximum packet delay, which may be provided by a QoS guarantee, to function properly.

DETAILED DESCRIPTION

In the interest of brevity and clarity, throughout the following disclosure references will be made to the example Internet protocol (IP) Multimedia subsystem (IMS) based Voice over IP (VoIP) network 110 of FIG. 1. Moreover, the following disclosure will be made using session initiation protocol (SIP) messages and/or SIP-based message exchanges. However, it should be understood that the methods and apparatus described herein to select a peered border element are applicable to other IMS and/or VoIP communication systems and/or networks (e.g., networks based on soft switches), VoIP devices, IMS devices, feature servers, tElephone NUMber mapping (ENUM) servers, border elements, access networks, IP networks, IMS networks and/or IMS communication systems, and/or other types of protocols, messages, and/or message exchanges.

Figure 1:
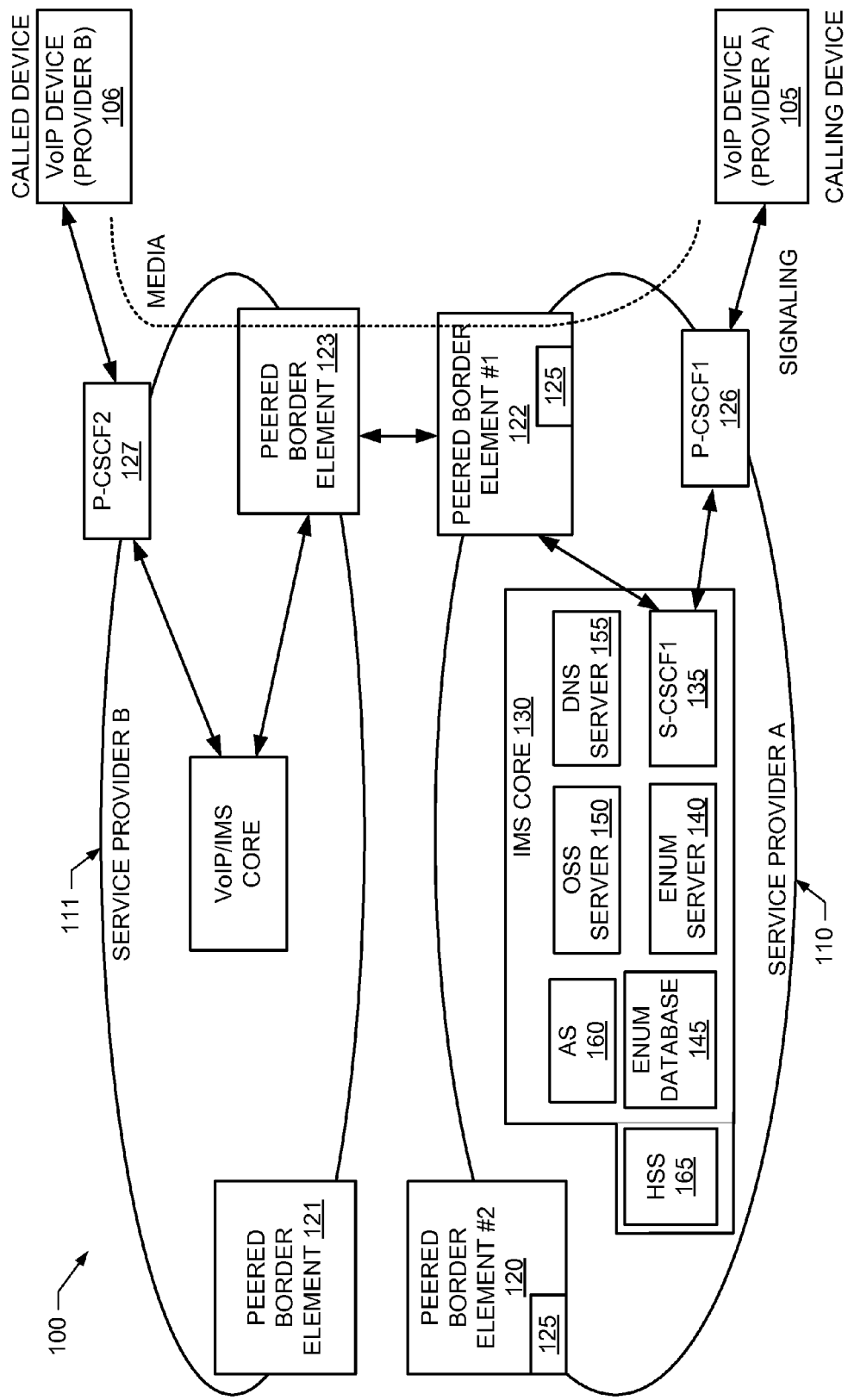
FIG. 1 is a schematic diagram illustrating an example IMS communications system and example call signaling and media flows.

FIG. 1 is a schematic illustration of an example communication system 100 including any number and/or type(s) of VoIP user devices, two of which are designated at reference numerals 105 and 106. Example VoIP user devices 105 and 106 include, but are not limited to, IMS (e.g., VoIP) phones, VoIP residential gateways, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), and/or VoIP kiosks. The example VoIP devices 105 and 106 of FIG. 1 may be implemented and/or be found at any number and/or type(s) of locations. Further, the VoIP devices 105 and 106 may be fixed location devices, substantially fixed location devices and/or mobile devices. Moreover, the VoIP devices 105 and 106 may have equipment communicatively and/or electrically coupled to them. For example, a VoIP ATA may be coupled to a telephone, and/or a VoIP residential gateway may be coupled to a PC and/or set-top box. Further still, the VoIP devices 105 and 106 may be associated with the same and/or different service providers. For example as shown in FIG. 1, the VoIP device 105 is associated with a first service provider 110, and the VoIP device 106 is associated with a second service provider 111.

To provide communication services to a first set of subscribers (e.g., associated with a first service provider), the example communication system 100 of FIG. 1 includes an IMS network 110 made available by the service provider A. Likewise, to provide communication services to a second set of subscribers (e.g., associated with a second service provider), the example communication system 100 of FIG. 1 includes any type of IMS and/or VoIP network 111 made available by the service provider B. In some instances, the example calling network 110 implements any or all of the example methods and/or apparatus to select a peered border element described below in connection with the IMS network 111. In general, the example IMS network 110 of FIG. 1 can provide and/or enable IMS communication services (e.g., telephone services, Internet services, data services, messaging services, instant messaging services, electronic mail (email) services, chat services, video services, audio services, gaming services, voicemail, facsimile services, etc.) to the example VoIP device 105, and/or to VoIP devices of other service providers (e.g., the example VoIP device 106).

The example service provider networks 110 and 111 of FIG. 1 are communicatively coupled via any number of pairs of peered border elements. A first pair of peered border elements is designated in FIG. 1 with reference numerals 120 and 121, and a second pair of peered border elements is designated with reference numerals 122 and 123. Mated pairs of peered border elements 120-123 implement, for example, handshaking, media translation(s) and/or protocol message modification(s) to facilitate communication sessions between subscribers of two service provider networks (e.g., the example networks 110 and 111).

Typically, the pairs of peered border elements 120, 121 and 122, 123 are located so as to provide communicative coupling between the service provider networks 110 and 111 at geographically separated locations. The locations at which peered border elements 120, 122 are located may differ depending on with which service provider(s) the IMS network 110 has a peering relation. Further, while the service provider 110 of FIG. 1 is illustrated as having a peering relationship with service provider 111, the service provider 110 may have other peering relationships with other service providers. Moreover, the peering locations for those other service providers may be different from the peering locations for service provider 111. In some examples, there may be more than one pair of peered bordered elements 120, 121 and 122, 123 at a given geographic location. In such examples, the additional peered border elements 120, 121 and 122, 123 may be implemented for redundancy purposes and/or to provide additional processing capability(-ies) at that location. In some examples, the peered border elements 120-123 are located at IP peering locations to facilitate deterministic IP Quality-of-Service (QoS). However, not all IP peering locations need support VoIP peering.

To collect real-time and/or dynamic network performance data and/or information, each of the example peered border elements 120 and 122 includes a performance monitor 125. The example performance monitors 125 of FIG. 1 measure, collect and/or aggregate any number and/or type(s) of data and/or information representative of the historical and/or present performance of the IMS network 110. Example network performance data and/or information may include, but is not limited to, jitter, round-trip delay, latency, out of order data, data throughput rate, processing load, memory usage, communication path utilization, border element status (e.g., operational, failing and/or failed), etc. The example performance monitors 125 may be configured to collect data within any layer of a protocol stack implemented by the border elements 120 and/or 121. As described below, the data and/or information measured, collected and/or aggregated by the performance monitors 125 may be used to determine one or more parameters representative of the real-time, dynamic properties of the IMS network 110, such as routing congestions, overloaded border elements, partially and/or fully failed border elements, etc. In some example, performance monitors 125 may be implemented by other devices of the IMS network 110, such as routers, switches, hubs, etc. Devices and/or servers of the service provider 111 may also collect real-time and/or dynamic network performance data and/or information. In such instances, the service providers 110 and 111 may exchange collected network performance data and/or information to enable each service provider 110, 111 to better optimize the performance of their network, but such an exchange is not mandatory for proper implementation of the example methods and apparatus to dynamically select a peered VoIP border element described herein.

To implement the communication services, the example IMS network 110 of FIG. 1 includes an IMS core 130. To connect a VoIP device (e.g., the VoIP device 105) to the IMS network 110 and the IMS core 130, the IMS network provides a proxy call session control function servers (e.g., P-CSCF servers 126). The P-CSCF server 126 and a second P-CSCF server 127 provide an interface for routing signaling messages to appropriate destinations in the respective IMS networks 110 and 111. For example, the P-CSCF server 126 may receive a SIP INVITE message from the VoIP device 105 and forward the message to an appropriate server in the IMS network 110.

In the illustrated example IMS network 110 of FIG. 1, each VoIP device (e.g., the example VoIP device 105) that is registered to the example IMS network 110 is associated with and/or assigned to a serving call session control function (S-CSCF) server (one of which is designated in FIG. 1 with reference numeral 135). The example S-CSCF1 server 135 of FIG. 1 is responsible for handling incoming and/or outgoing IMS (e.g., VoIP) communication sessions (e.g., telephone calls, data and/or video sessions) associated with its registered VoIP devices (e.g., the VoIP device 105). Among other functions, the example S-CSCF1 server 135 utilizes QoS and the status of multiple peered border elements to assign a VoIP session (or other voice, data and/or video) to be handled by an appropriate peered border element. To this end, the S-CSCF server calculates and/or receives QoS parameters based on qualities of the VoIP session and uses the QoS parameters to calculate a composite QoS parameter, which is then used to assign an appropriate peered border element from a list of several possible peered border elements. An example operation of the example S-CSCF1 server 135 of FIG. 1 is described below in connection with FIG. 3.

While one S-CSCF1 server 135 is illustrated in FIG. 1, the IMS core 130 and/or, more generally, the example IMS network 110 may include any number and/or type(s) of S-CSCF servers, and each such S-CSCF server may support any number and/or type(s) of VoIP devices. The example S-CSCF1 server 135 of FIG. 1 performs session control, maintains session states and/or enables communications with call feature servers (not shown) for its associated and/or registered VoIP devices. For instance, when the VoIP device 105 initiates, for example, an outgoing telephone call to the example VoIP device 106, a communication session initiation message (e.g., a SIP INVITE message) sent by the VoIP device 105 is routed by the IMS network 110 to the S-CSCF1 server 135 associated with the VoIP device 105.

To locate and/or identify the VoIP device and/or VoIP endpoint (e.g., the example VoIP device 106) associated with a called party (e.g., a called telephone number), the example IMS core 130 of FIG. 1 includes any number of ENUM servers, one of which is designated in FIG. 1 with reference numeral 140. Based upon an ENUM query request message received from a S-CSCF server (e.g., the example S-CSCF1 server 135), the example ENUM server 140 of FIG. 1 performs a lookup of an ENUM database 145 that stores associations of called party identifiers (e.g., E.164 telephone numbers) to one or more uniform resource identifiers (URIs) (e.g., a SIP URI, an HTTP URI, etc. corresponding to peered border elements and/or called devices). However, an ENUM database may store any number and/or type(s) of associations between any number and/or type(s) of identifiers. The example ENUM server 140 returns the one or more URIs to the S-CSCF1 server 135.

As described below in connection with FIG. 3, the example ENUM database 145 may contain more than one database records to associate more than one URI with a particular called party identifier. For example, if a called party (e.g., the VoIP device 106) is associated with another service provider (e.g., the example network 111), the ENUM database 145 may contain database records for each of one or more peered border elements 120, 122 via which the communication session may be established. When two or more database records (e.g., corresponding to two or more peered border elements 120, 122) are listed for a called party identifier, each of the database records may have one or more associated values that represent a relative prioritization of each destination. The priority values (and/or the order in which the database records are listed in the ENUM database 145) are returned by the ENUM server 140 to the S-CSCF1 server 135 along with the URIs, and allow the S-CSCF1 server 135 to select a particular destination (e.g., a particular peered border element 120, 122).

The S-CSCF1 server 135 may also support QoS for VoIP sessions. The QoS requirements for a VoIP session may be different for individual types of sessions. For example, an online gaming application may require a better QoS than a telephone call, where a "better" QoS results in fewer or shorter data packet delays and/or fewer dropped data packets (i.e., higher communication channel quality). Similarly, the relative priorities of peered border elements 120, 122 in the ENUM database as described above may indicate relative ability to provide QoS to a given VoIP session. Thus, a peered border element 120, 122 may be appropriately chosen by accounting for peered border element priorities and QoS requirements of VoIP sessions.

To determine the QoS requirements of a VoIP session the S-CSCF1 server 135 in the example defines and considers a number of parameters associated with the session. For example, a Grade of Service (GoS) parameter may be defined for a VoIP device 105. The GoS, which describes a particular attempted and/or expected performance range, may be associated with a level of service purchased for the VoIP device 105 from the service provider 110 by a customer. The customer purchasing the level of service may own, lease, or borrow the VoIP device 105. Additionally, each VoIP device 105 and 106 may have its own independent GoS or a shared GoS level based on, for example, a subscriber profile of each device 105 and 106. The GoS parameter may have values such as, for example, Excellent, Very Good, Good, Fair, and Best Effort (in order from best to worst). Alternatively, the GoS parameter may be described using any number and/or type of values.

To determine GoS for the VoIP device 105, the S-CSCF1 server 135 may request a subscriber profile, which includes, among other things, the GoS for the VoIP device 105. The subscriber profile may also be known as a user profile or caller profile. The example subscriber profile for the VoIP device 105 is stored at a Home Subscriber Server (HSS) 165 within the IMS core 130. Further, although the example S-CSCF1 server 135 determines the composite QoS parameter based at least in part on GoS, the S-CSCF1 server 135 may determine the composite QoS parameter regardless of, in conjunction with, or based purely on GoS and/or the subscriber profile.

Subscriber profiles are based on, for example, customer orders for service. A customer may be any person paying for or receiving for free a network service such as a digital subscriber line (DSL), wireless network access, cable, and/or any other network service. In an example, a customer contacts a service provider (e.g., Service Provider A) and requests service at a particular GoS (e.g., Excellent). The Service Provider A creates a subscriber profile containing, among other things, the GoS level to be received by the customer. The subscriber profile is stored at the HSS 165 and may be used to determine a QoS for a VoIP session associated with the customer. The HSS 165 may also modify an existing subscriber profile if, for example, a customer wishes to upgrade or downgrade the GoS. Further, the customer may interact or contact Service Provider A using any means, such as an Internet-based service ordering system, telephony, electronic mail, or facsimile.

A traffic type parameter may be defined by the S-CSCF1 and used to define QoS for the VoIP session, which may be defined by the type of application using the session. Example traffic types may include Video, Voice, and Data in order from highest QoS requirement to lowest QoS requirement.

Another parameter that the S-CSCF1 may use to define QoS requirements for a VoIP session specifies a preferred mode of communication for the VoIP device 106 of the called party. The preferred mode of communication parameter may indicate which one of multiple VoIP devices the called party prefers to be reached at and in what order to select each one of the multiple VoIP devices.

A presence mode status parameter may indicate whether the VoIP device 106 associated with the called party is available to be called. For example, if it is known that Service Provider B has a service problem in a portion of the network service the VoIP device 106, the presence mode status parameter may indicate the VoIP device 106 is not present. The described parameters, or other parameters useful in determining QoS requirements for a VoIP session, may be used to generate a composite QoS parameter. Each parameter may be weighted by relative importance or every parameter may affect the composite QoS parameter equally.

The S-CSCF1 server 135 receives the prioritized list of peered border elements 120, 122 from the ENUM server 140 and calculates the composite QoS parameter based on the individual QoS parameters. Alternatively, the P-CSCF1 server 126 calculates the composite QoS result from the QoS parameters and sends it to the S-CSCF1 server 135. From the composite QoS parameter and the prioritized list of peered border elements 120, 122, the S-CSCF1 server 135 determines an appropriate peered border element to host the VoIP session. Additionally or alternatively, the S-CSCF1 server 135 may use the prioritized list of peered border elements 120, 122 and the QoS parameters (e.g., GoS, traffic type, preferred mode of communication and/or presence mode status) to calculate a matrix result, which may score each peered border element 120, 122 with respect to the VoIP session.

After evaluating the priority of each peered border element 120, 122 with respect to the composite QoS parameter, the S-CSCF1 server 135 may assign the VoIP session to an appropriate peered border element. In an example situation in which the S-CSCF1 has multiple VoIP sessions queued to be assigned, the S-CSCF1 server 135 may assign the VoIP sessions to peered border elements in the order of highest composite QoS parameter to lowest composite QoS parameter. In such a situation, the network resources may be utilized most effectively to serve the VoIP sessions with the highest QoS requirements. It should be noted that the most appropriate peered border element may not necessarily be the peered border element with the highest QoS capacity.

For example, during times of heavy VoIP traffic it may be desirable to assign a VoIP session with a low QoS requirement to a peered border element 120, 122 that is already heavily loaded, which may free capacity on other peered border elements to handle sessions requiring a higher QoS.

In the absence of priority values (and/or listing order information and/or QoS parameters), the S-CSCF1 server 135 may select a particular destination using any applicable method(s), algorithm(s) and/or logic, such as round-robin selection. A returned URI may also be returned with an indication that the URI is inactive and, thus, not available to be selected and/or used by the S-CSCF1 server 135 for the called party. In some examples, the example ENUM server 140 does not return such inactive URIs to the S-CSCF1 server 135.

To determine and/or adjust the relative priority of the ENUM database records for called parties, the example IMS core 130 of FIG. 1 includes an operational support system (OSS) server 150. In the illustrated example of FIG. 1, the OSS server 150 represents one or more elements of a network operations center and/or one or more elements of an operational support system. The example OSS server 150 periodically and/or aperiodically collects the network performance data and/or information collected by the example performance monitors 125. Based on the collected network performance data and/or information, the example OSS server 150 periodically and/or aperiodically computes one or more peered border element metrics that may be used to prioritize the selection of the peered border elements 120, 122. For example, the OSS can compute the congestion of communication paths associated with the peered border elements 120, 122, the processing load of the peered border elements 120, 122, and/or the state(s) of the peered border elements 120,122 (e.g., operational, partially failed, failing and/or failed). Such peered border element metrics may be computed using any past, present and/or future algorithm(s), method(s), apparatus and/or logic, and descriptions of the same are beyond the scope of this disclosure.

Based on the computed peered border element metrics, the example OSS server 150 of FIG. 1 prioritizes the order in which the peered border elements 120, 122 are to be selected. For example, lightly loaded peered border elements 120, 122 are preferred over more heavily loaded peered border elements 120, 122 for VoIP sessions having high QoS requirements, failing and/or failed peered border elements 120, 122 are to be avoided, peered border elements 120, 122 having congested communication paths and/or links are less preferable to ones having less congested communication paths and/or links, etc. After prioritizing the peered border elements 120, 122, the example OSS server 150 modifies one or more records of the ENUM database 145 to represent the computed relative priorities of the peered border elements 120, 122. ENUM database records may be prioritized by modifying priority values of the ENUM database records. Examples of priority values currently used may be the ORDER and PREFERENCE fields, of which the ORDER field has precedence over the PREFERENCE field when considering the relative priority of the ENUM database record. Additionally or alternatively, ENUM database records may be added and/or removed for a particular called party. For example, if a particular peered border element 120, 122 has failed and, thus, is not available to process a communication session for the called party, its associated ENUM database record may be removed and/or marked as inactive. Likewise, the OSS server 150 may change the status of a particular peered border element 120, 122 from an inactive state to an active state (e.g., available for routing a communication session) by updating its associated ENUM database record. If a route for a called party is unavailable, the ENUM database may be modified to indicate an alternative route (e.g., use peered border elements 120 and 121 rather than peered border elements 122 and 123). The OSS server 150 may modify the ENUM database 145 directly by, for example, locking a database record to be changed, modifying the database record, and then unlocking the database record. Additionally or alternatively, the ENUM database 145 may be modified by accessing an application programming interface (API) implemented by and/or provided by the example ENUM server 140.

The modifications of the ENUM database 145 by the example OSS server 150 of FIG. 1 may be performed without the involvement and/or knowledge of the S-CSCF1 server 135 and/or the ENUM server 140. In this way, the OSS server 150 can adaptively affect the prioritization of the peered border elements 120, 122 without there being a need to modify traditional ENUM functions and/or services typically implemented by the S-CSCF1 server 135 and/or the ENUM server 140. Moreover, if the method(s) and/or algorithm(s) by which the selection of the peered border elements 120, 122 are changed, the S-CSCF1 server 135 and/or the ENUM server 140 do not require modification, as the changes may be localized to the OSS server 150. By prioritizing the peered border elements 120, 122, the OSS server 150 reduces the likelihood of routing errors, reduces communication session setup times, adjusts the IMS network 110 in response to failing/failed devices, etc., as compared to traditional peered border elements selection methods.

To resolve a URI to an IP address, the example IMS core 130 of FIG. 1 includes any type of DNS server 155. For a particular URI (SIP, HTTP and/or otherwise) and using any applicable method(s), logic and/or algorithm(s), the example DNS server 155 performs a DNS lookup to obtain an IP address assigned to and/or associated with the URI.

An application server (AS) 160 may be included in the IMS core 130. The application server 160 interacts with the SIP INVITE messages on the application layer as defined by the individual implementation. For example, an application server 160 hosting VoIP calls may provide the S-CSCF1 server 135 with values for QoS parameters associated with a VoIP session. Example QoS parameters may include grade of service, traffic type, preferred mode of communication and/or presence mode status, as described above.

While an example IMS network 110 has been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example peered border elements 120, 122, the example performance monitors 125, the example IMS core 130, the example S-CSCF1 server 135, the example ENUM server 140, the example OSS server 150, the example DNS server 155 and the example application server 160 illustrated in FIG. 1 are logical entities. They may, therefore, be implemented separately and/or in any combination using, for example, machine accessible instructions executed by one or more computing devices and/or computing platforms (e.g., the example processing platform 500 of FIG. 5). Further, the example peered border elements 120, 122, the example performance monitors 125, the example IMS core 130, the example S-CSCF1 server 135, the example ENUM server 140, the example OSS server 150, the example DNS server 155, the example application server 160 and/or, more generally, the example IMS network 110 may be implemented by hardware, software, firmware and/or any combination of hardware, software and/or firmware. Further still, the example IMS network 110 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors. For example, the IMS core 130 may include and/or utilize one or more of a P-CSCF server, an S-CSCF server, an interrogating CSCF server, a feature server, an application server, an HSS, a media gateway, a breakout gateway control function (BGCF) server, a media gateway control function (MGCF) server, a softswitch, an IP router, an IP switch, etc.

Although the systems and methods described herein are discussed with reference to example VoIP sessions, it is contemplated that the described systems and methods may be used for any voice, video and/or data communications where QoS may be applied. Additionally, either or both of the VoIP devices 105 and 106 may be replaced by or may complement other devices, such as mobile devices or video conferencing devices. The systems and methods described here may also be applied to mobile telecommunications and data services using QoS.

Figure 2:
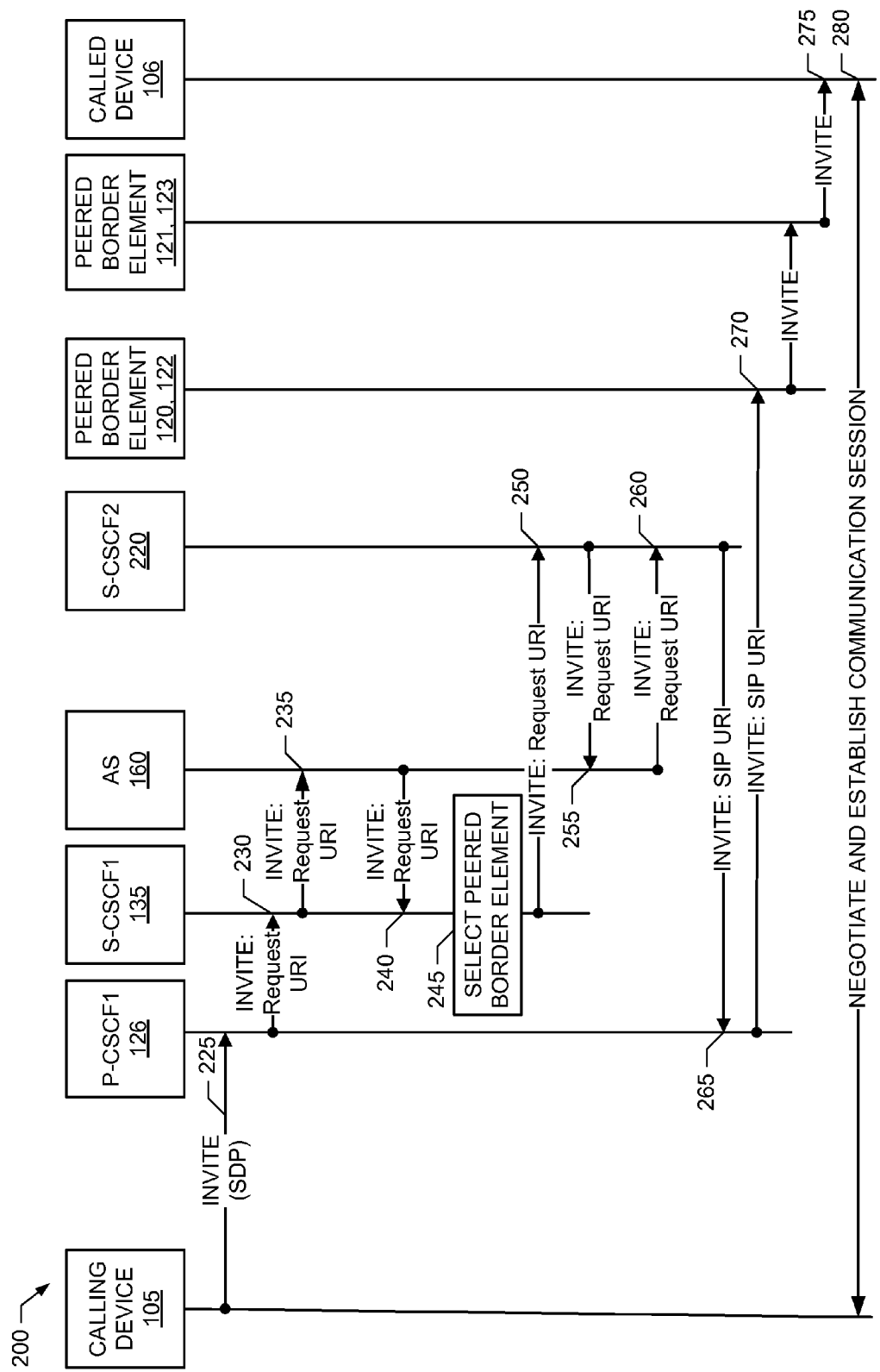
FIG. 2 is a flow diagram illustrating example exchanges and call flows for a VoIP session utilizing Quality-of-Service.

FIG. 2 illustrates example protocol message exchanges and flowcharts representative of processes that may be carried out by, for example, machine executable instructions on a processor to implement the example IMS networks 110 and 111 of FIG. 1. The VoIP device 105 associated with a calling party initiates a session by sending a SIP INVITE message 225 to the S-CSCF 135 of FIG. 1 via a Proxy-CSCF1 (P-CSCF1) server 126 and/or an access border element (not shown). The P-CSCF1 server 126 routes SIP INVITE message 230 to the S-CSCF1 server 135 that has previously registered or been registered with the VoIP device 105.

The example S-CSCF server 135 receives the SIP INVITE message and forwards the SIP INVITE message 235 to an application server (AS) 160. The application server 160 may help determine QoS parameters associated with the VoIP session by, for example, providing grade-of-service information for the calling VoIP device 105. The application server 160 may return one or more QoS parameter values to the S-CSCF1 server 135 in response 240 to the SIP INVITE message 235.

After the S-CSCF1 server 135 receives QoS parameters from the AS 160, the S-CSCF1 server 135 enters block 245 to select a peered border element 120, 122 to handle the VoIP session. To select a peered border element 120, 122, the S-CSCF1 server 135 queries the ENUM server 140 to resolve the called party E.164 destination (e.g., dialed phone number) from the INVITE message into a destination (e.g., SIP URI) and to return a list of peered border elements. Upon receiving the request, the ENUM server 140 resolves the called party E.164 destination to a SIP URI address. Resolving the E.164 destination to a SIP URI address may be accomplished by consulting an ENUM database, which holds records mapping, for example, E.164 destinations or telephone numbers to SIP URI addresses. The ENUM database may also include records of peered border elements, which may be updated periodically to reflect real-time network conditions as described above. Each peered border element record may be associated with one or more priority fields, indicating the relative capability of each peered border element to support QoS loads. The peered border element records may be organized into a list ordered by priority.

The ENUM server returns the SIP URI address and the list of prioritized peered border elements to the S-CSCF1 server 135. The S-CSCF1 server 135, now having knowledge of the VoIP device 105 associated with the calling party and the VoIP device 106 associated with the called party, determines any remaining QoS parameters associated with the session. The QoS parameters may include Grade of Service, traffic type, preferred mode of communication, presence mode status, and/or any other parameter that may describe the QoS requirements of the VoIP session and have not been received from an external source (e.g., the P-CSCF1 server 126, the application server 160). After identifying the values associated with the QoS parameters, the S-CSCF1 server 135 calculates a composite QoS parameter. Using the composite QoS parameter and the list of prioritized peered border elements, the S-CSCF1 server 135 determines an appropriate peered border element 120, 122 to handle the VoIP session.

After a peered border element (e.g., peered border element 122) is selected (block 245), the S-CSCF1 server 135 forwards the SIP INVITE message 250 to an appropriate S-CSCF2 server 220 associated with Service Provider B. The S-CSCF2 server 220 may communicate 255 with the application server 160 or a different application server to register a QoS treatment for the session. After receiving a response 260 from the application server 160, the S-CSCF2 server 220 forwards the SIP INVITE message 265 to the P-CSCF1 server 126. The P-CSCF1 server 126 then sends an INVITE message 270 including the URIs for the device 106 to the selected peered border element 120, 122, which pre-alerts the called device 106 via the corresponding peered border element 121, 123. Exchanges (e.g., 225, 230, 235) shown in FIG. 2 may be performed and/or responded to by standard messages such as, for example, SIP INVITE, 100 Trying, 183 Session Progress, and/or 200 OK.

When the VoIP device 106 has been pre-alerted to the session, the VoIP devices 105 and 106 negotiate and establish the communication session 280. For example, the IMS systems 110 and 111 begin to reserve network resources to provide QoS for the VoIP session. QoS resource reservation may occur according to published standards. For example, the P-CSCF1 server 126 and the P-CSCF2 server 127 may generate a Packet Data Protocol (PDP) or other appropriate context and issue QoS authorization tokens to the respective VoIP devices 105 and 106 for use with the selected peered border element 120, 122. PDP is a network protocol used by packet switching networks to communicate with general packet radio services (GPRS) networks. The PDP context includes the QoS profile. The authorization token may be sent as a part of the packet data associated with the VoIP session, which alerts the peered border elements supporting the call to the priority of the packet data.

Figure 3:
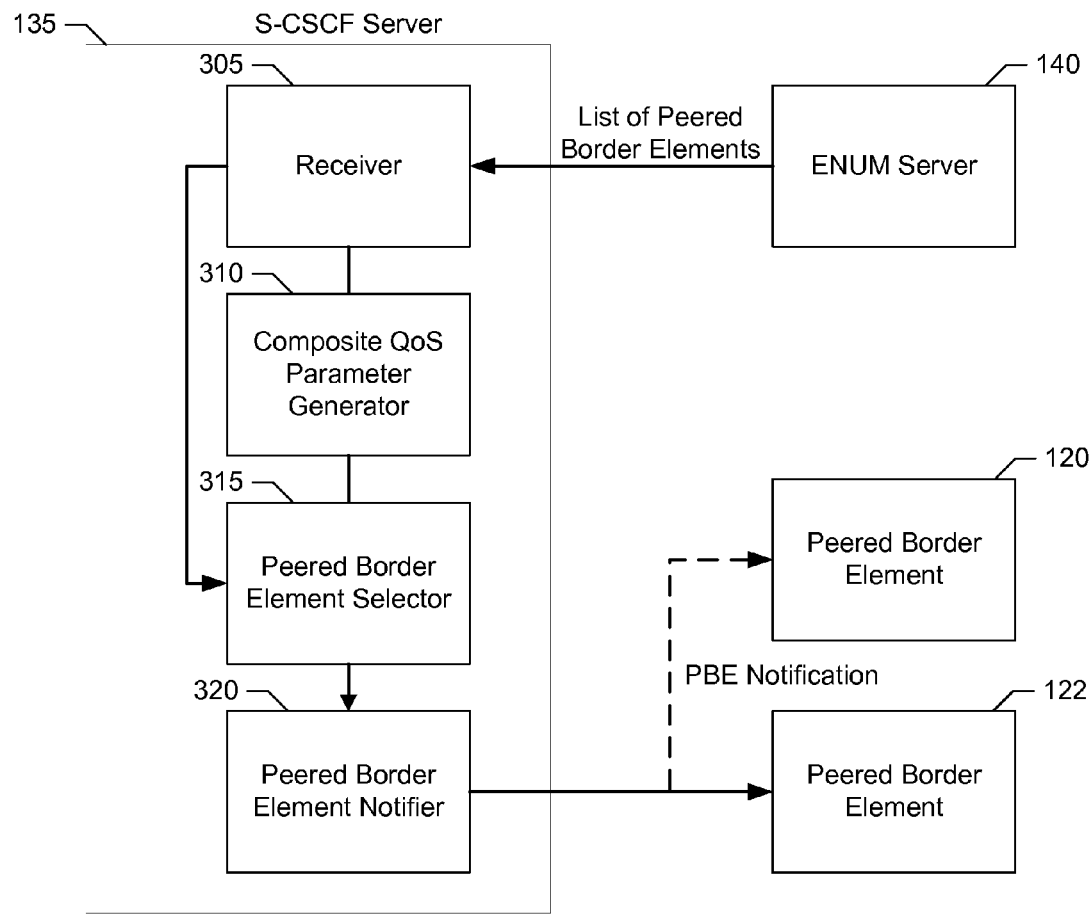
FIG. 3 is a block diagram of an example S-CSCF server as described in connection with FIGS. 1 and/or 2.

FIG. 3 is a block diagram of an example S-CSCF server 135 as described in connection with FIGS. 1 and/or 2. The example S-CSCF server 135 includes a receiver 305, a Composite QoS Parameter Generator 310, a Peered Border Element Selector 315, and a Peered Border Element Notifier 320. The receiver 305 is communicatively coupled to the example ENUM server 140 and example OSS server 150 described in connection with FIGS. 1 and/or 2. When the S-CSCF server 135 selects a peered border element 120, 122 to host a VoIP session, the receiver 305 receives a prioritized list of peered border elements and corresponding priority values from the ENUM server 140 and one or more QoS parameters from, for example, the P-CSCF1 server 126. The prioritized list is passed to the Peered Border Element Selector 315 and any received QoS parameters are passed to the Composite QoS Parameter Generator 310.

The Composite QoS Parameter Generator 310 receives QoS parameters from the receiver 305, a SIP INVITE message (e.g., the message described in connection with FIG. 2) and/or other sources and generates a composite QoS parameter associated with the VoIP session. The composite QoS parameter is then passed to the Peered Border Element Selector 315. The Peered Border Element Selector 315 receives the composite QoS parameter and the prioritized list and selects a peered border element 120, 122 from the prioritized list based on the priority values and the composite QoS parameter. For example, the Peered Border Element Selector 315 selects one of the peered border elements 120 or 122 that has the highest priority value for a VoIP session with the highest composite QoS parameter.

When a peered border element 120, 122 is selected for the VoIP session, the Peered Border Element Notifier 320 notifies the selected peered border element 120, 122 via the appropriate channels. The Peered Border Element Notifier 320 registers the QoS treatment for the VoIP session with the selected peered border element 120, 122 and the P-CSCF servers 126 and 127 generate a PDP context and QoS authorization tokens.

The example S-CSCF server 135 as shown in FIG. 3 includes but does not show functionality currently attributed to S-CSCF servers by those of ordinary skill in the art to emphasize using the composite QoS parameter and the prioritized list of peered border elements to assign a voice, data and/or video session to a peered border element.

Figure 4:
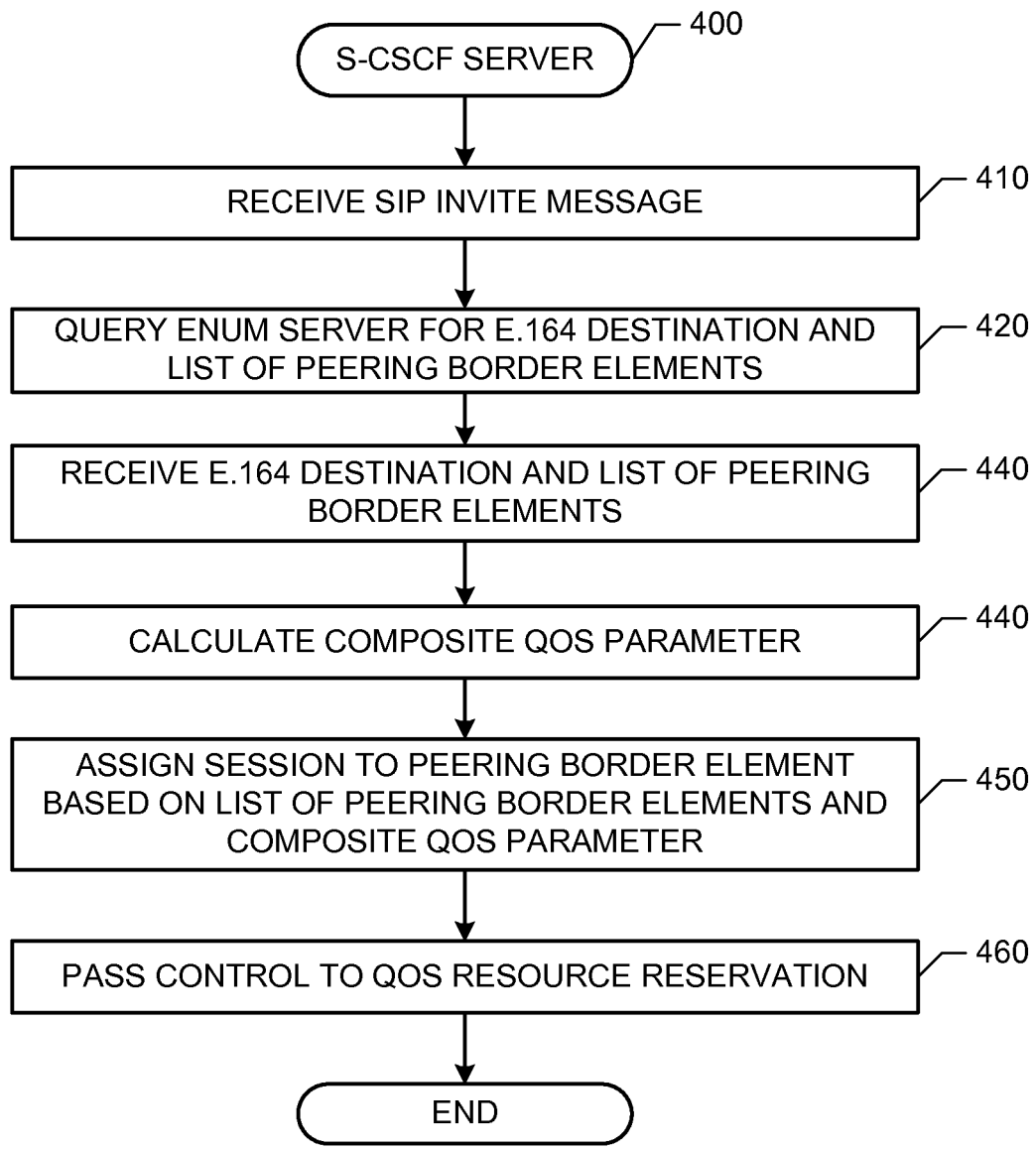
FIG. 4 is a block diagram illustrating an example method for selecting a peered border element.

FIG. 4 illustrates example machine accessible instructions that may be executed to implement any or all of the example S-CSCF servers 135 and/or 220 of FIGS. 1-3. The example protocol exchanges and/or the example machine accessible instructions of FIGS. 2 and/or 4 may be carried out by a processor, a controller and/or any other suitable processing device. For example, the example protocol exchanges and/or the machine accessible instructions of FIGS. 2 and/or 4 may be embodied in coded instructions stored on a tangible medium such as a flash memory, a ROM and/or RAM associated with a processor (e.g., the example processor 505 discussed below in connection with FIG. 5). Alternatively, some or all of the example protocol exchanges and/or the machine accessible instructions of FIGS. 2 and/or 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example protocol exchanges and/or the machine accessible instructions of FIGS. 2 and/or 4 may be implemented manually or as any combination of any of the foregoing techniques, for example, any combination of firmware, software, discrete logic and/or hardware. Further, persons of ordinary skill in the art will readily appreciate that many other methods of implementing the example operations of FIGS. 2 and/or 4 may be employed. For example, the order of execution of the blocks may be changed, and/or one or more of the blocks described may be changed, eliminated, sub-divided, or combined. Additionally, persons of ordinary skill in the art will appreciate that any or all of the example protocol exchanges and/or the machine accessible instructions of FIGS. 2 and/or 4 may be carried out sequentially and/or carried out in parallel by, for example, separate processing threads, processors, devices, discrete logic, circuits, etc.

FIG. 4 illustrates an example process that may be executed to implement the example S-CSCF server 135 of FIGS. 1 and/or 2. The method 400 begins by receiving a SIP INVITE message (block 410). The SIP INVITE message may include information describing a desired device to include in the session (i.e., a called party) such as, for example, a URL address or a SIP URI for use in querying a DNS server or an ENUM server. The S-CSCF server may then query an ENUM server (e.g., the example ENUM server 140 illustrated in FIGS. 1 and/or 2) and/or a DNS server, based on the information received in the SIP INVITE message (block 420). In an example, the S-CSCF server queries the ENUM server based on an E.164 telephone number. The example ENUM server returns a SIP URI address and a prioritized list of peered border elements as described above to the S-CSCF server (block 430).

After receiving the SIP URI address and the prioritized list of peered border elements, the S-CSCF server may calculate a composite QoS parameter from multiple QoS parameters associated with the VoIP session (block 440). For example, the S-CSCF server may calculate a composite QoS parameter from a GoS parameter, a traffic type parameter, a preferred mode of communication parameter, and a presence mode status parameter as described above in connection with FIG. 1. Alternatively, the S-CSCF server may receive the composite QoS parameter calculated from the QoS parameters by another server such as, for example, the P-CSCF server routing the message from the VoIP device. The composite QoS parameter may then be used to compare the priority values of each peered border element and select a peered border element based on the comparison (block 450). An example selection may include selecting a peered border element with a high priority value to handle a VoIP session with a high composite QoS parameter. Additionally or alternatively, the S-CSCF server may pass the VoIP session to a queue to be assigned in a particular order. When the VoIP session is assigned to a peered border element, the S-CSCF may relinquish control to another server to begin QoS resource reservation (block 460).

As an alternative to assigning an IP multimedia session to one of the available peered border elements, the peered border elements 120, 122 may be partitioned into p groups, where p is the number of grades of service. The peered border elements 120, 122 may be partitioned into groups equally or unequally, and/or they may be assigned to groups based on relative serving capability. For the example grades of service described above, a group of 100 peered border elements 120, 122 are partitioned into 5 groups. Each group, Excellent, Very Good, Good, Fair, and Best Effort has 20 peered border elements 120, 122 to serve IP multimedia sessions. The 20 peered border elements 120, 122 in the Excellent group have the greatest serving capacity for IP multimedia sessions, the 20 peered border elements 120, 122 in the Very Good group have the next best serving capacity, etc. The peered border elements 120, 122 may alternatively be assigned to a group dynamically, based on the serving capacity relative to the other available peered border elements 120, 122. Although only two peered border elements 120, 122 are shown for clarity, more such peered border elements may exist and can be accommodated, as described herein.

The S-CSCF1 server 135 assigns an IP multimedia session to a peered border element 120, 122 in a group based on the GoS of the calling party, which is retrieved as part of the subscriber profile from the HSS 165. The assignment to the peered border element 120, 122 may occur based on any algorithm to select a peered border element 120, 122 from the group corresponding to the GoS of the calling party. Alternatively, the S-CSCF1 server 135 may receive a list of peered border elements as described above, where the list also includes the group information for each peered border element 120,122. In this case, the S-CSCF1 server 135 assigns the IP multimedia session to a peered border element 120, 122 from the group corresponding to the GoS of the calling party 105.

Figure 5:
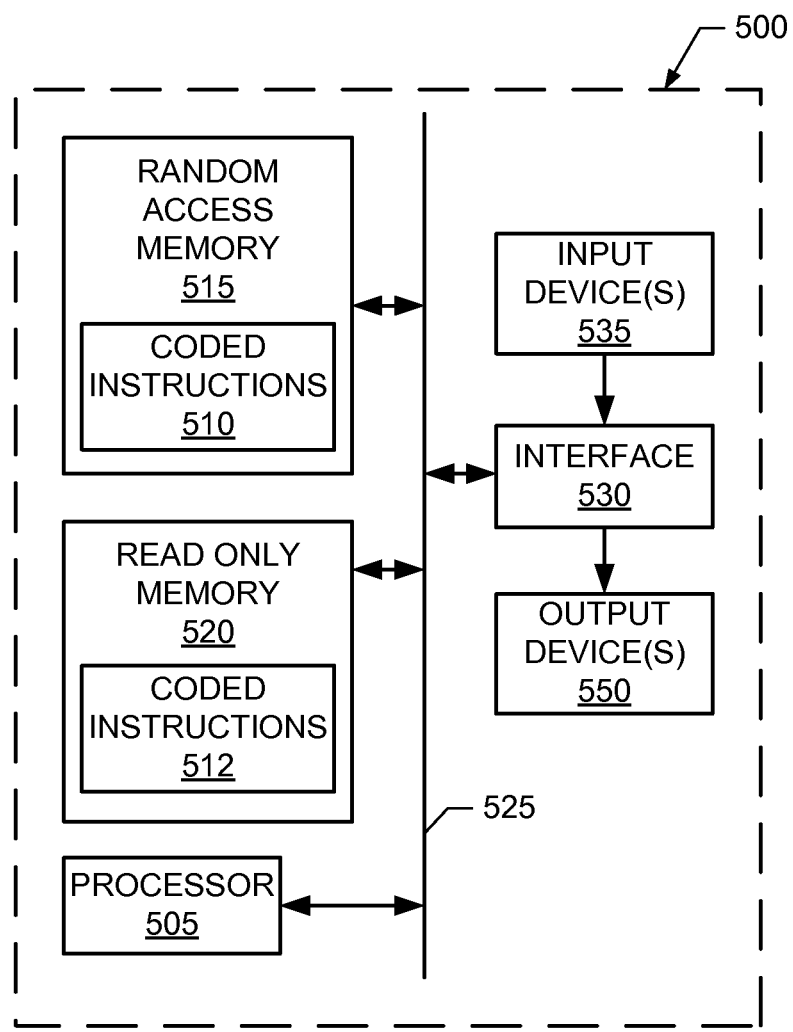
FIG. 5 is a schematic diagram of an example processor platform that may be used and/or programmed to implement the systems described herein.

FIG. 5 is a schematic diagram of an example processor platform 500 that may be used and/or programmed to implement all or a portion of any or all of the example VoIP devices 105 and/or 106, the example peered border elements 120, 122, the example performance monitors 125, the example P-CSCF servers 126 and 124, the example S-CSCF server 135, the example ENUM server 140, the example OSS server 150, the example DNS server 155, and/or the application server 160 of FIGS. 1-3. For example, the processor platform 500 can be implemented by one or more general purpose processors, processor cores, microcontrollers, etc.

The processor platform 500 of the example of FIG. 5 includes at least one general purpose programmable processor 505. The processor 505 executes coded instructions 510 and/or 512 present in main memory of the processor 505 (e.g., within a random-access memory (RAM) 515 and/or a read-only memory (ROM) 520). The processor 505 may be any type of processing unit, such as a processor core, a processor and/or a microcontroller. The processor 505 may execute, among other things, the example protocol message exchanges and/or the example protocol exchanges and/or the example machine accessible instructions of FIGS. 2 and/or 4 to implement the example methods and apparatus described herein.

The processor 505 is in communication with the main memory (including a ROM 520 and/or the RAM 515) via a bus 525. The RAM 515 may be implemented by DRAM, SDRAM, and/or any other type of RAM device, and ROM may be implemented by flash memory and/or any other desired type of memory device. Access to the memory 515 and the memory 520 may be controlled by a memory controller (not shown). One or both of the example memories 515 and 520 may be used to implement the example ENUM database 155 of FIG. 1.

The processor platform 500 also includes an interface circuit 530. The interface circuit 530 may be implemented by any type of interface standard, such as an external memory interface, serial port, general purpose input/output, etc. One or more input devices 535 and one or more output devices 550 are connected to the interface circuit 530.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to assign peered border elements to a communication session, comprising:
  selecting, by executing a first instruction with a processor, a peered border element to handle a communication session based on a list of peered border elements and a first composite quality-of-service parameter of the communication session, the list of peered border elements being prioritized based on respective statuses of the peered border elements in the list, the first composite quality-of-service parameter being based on weighted quality-of-service parameters of the communication session including a grade of service parameter of the communication session and a preferred mode of communication for a voice over Internet protocol device of a called party in the communication session, the grade of service parameter including an attempted performance range and an expected performance range of the communication session, the grade of service parameter being based on a level of service for the communication session, and the preferred mode of communication indicating one of multiple devices at which the called party prefers to be reached; and
  controlling, by executing a second instruction with the processor, a second server to generate a quality-ofservice authorization token to reserve network resources associated with the selected peered border element.

2. The method as defined in claim 1, wherein the communication session includes at least one of voice-over-Internet protocol session and a telephone call.

3. The method as defined in claim 1, wherein the preferred mode of communication indicates an order in which to select the multiple voice over Internet protocol devices.

4. The method as defined in claim 1, wherein the communication session is a first communication session and further including, prior to assigning the first communication session, assigning a second communication session to be handled by a second peered border element of the peered border elements based on a second composite quality-of-service parameter, the assigning of the second peered border element based on relative values of the first composite quality-of-service parameter and the second composite quality-of-service parameter.

5. The method as defined in claim 1, further including creating a subscriber profile based on the grade of service parameter, the first composite quality-of-service parameter being based on the subscriber profile.

6. The method as defined in claim 1, further including partitioning the peered border elements into sets based on the grade of service parameter, the selecting of the peered border elements including selecting the peered border element from one of the sets based on the first composite quality-of-service parameter and the respective statuses of the peered border elements in the sets.

7. The method as defined in claim 1, wherein the status includes real-time network conditions.

8. A communications network device, comprising:
a processor; and
a memory including computer readable instructions which, when executed by the processor, cause the processor to perform operations comprising:
selecting a peered border element to handle a communication session based on a list of peered border elements and a first composite quality-of-service parameter of the communication session, the list of peered border elements being prioritized based on respective statuses of the peered border elements in the list, the first composite quality-of-service parameter being based on weighted quality-of-service parameters of the communication session including a grade of service parameter of the communication session and a preferred mode of communication for a voice over Internet protocol device of a called party in the communication session, the grade of service parameter including an attempted performance range and an expected performance range of the communication session, the grade of service parameter being based on a level of service for the communication session, and the preferred mode of communication indicating one of multiple devices at which the called party prefers to be reached; and
controlling a second server to generate a quality-of-service authorization token to reserve network resources associated with the selected peered border element.

9. The device as defined in claim 8, wherein the communication session includes a voice-over-Internet protocol session.

10. The device as defined in claim 9, wherein the voice-over-Internet protocol session includes a telephone call.

11. The device as defined in claim 8, wherein the communication session is a first communication session and the operations further include, prior to assigning the first communication session, assigning a second communication session to be handled by a second peered border element of the peered border elements based on a second composite quality-of-service parameter, the assigning of the second peered border element based on relative values of the first composite quality-of-service parameter and the second composite quality-of-service parameter.

12. The device as defined in claim 8, wherein the operations further include creating a subscriber profile based on the grade of service parameter, the first composite quality-of-service parameter being based on the subscriber profile.

13. The device as defined in claim 8, wherein the operations further include partitioning the peered border elements into sets based on the grade of service parameter, the selecting of the peered border elements including selecting the peered border element from one of the sets based on the first composite quality-of-service parameter and the respective statuses of the peered border elements in the sets.

14. The device as defined in claim 8, wherein the status includes real-time network conditions.

15. A tangible computer readable storage device comprising computer readable instructions which, when executed by a processor, cause the processor to perform operations comprising:
selecting a peered border element to handle a communication session based on a list of peered border elements and a first composite quality-of-service parameter of the communication session, the list of peered border elements being prioritized based on respective statuses of the peered border elements in the list, the first composite quality-of-service parameter being based on weighted quality-of-service parameters of the communication session including a grade of service parameter of the communication session and a preferred mode of communication for a voice over Internet protocol device of a called party in the communications session, the grade of service parameter including an attempted performance range and an expected performance range of the communication session, the grade of service parameter being based on a level of service for the communication session, and the preferred mode of communication indicating one of multiple devices at which the called party prefers to be reached; and
controlling a second server to generate a quality-of-service authorization token to reserve network resources associated with the selected peered border element.

16. The storage device as defined in claim 15, wherein the first communication session includes a voice-over-Internet protocol session.

17. The storage device as defined in claim 15, wherein the communication session is a first communication session and the operations further include, prior to assigning the first communication session, assigning a second communication session to be handled by a second peered border element of the peered border elements based on a second composite quality-of-service parameter, the assigning of the second peered border element based on relative values of the first composite quality-of-service parameter and the second composite quality-of-service parameter.

18. The storage device as defined in claim 15, wherein the operations further include creating a subscriber profile based on the grade of service parameter, the first composite quality-of-service parameter being based on the subscriber profile.

19. The storage device as defined in claim 15, wherein the operations further include partitioning the peered border elements into sets based on the grade of service parameter, the selecting of the peered border elements including selecting the peered border element from one of the sets based on the first composite quality-of-service parameter and the respective statuses of the peered border elements in the sets.

20. The storage device as defined in claim 15, wherein the status includes real-time network conditions.

* * * * *